United States Patent
Liao et al.

(10) Patent No.: US 6,275,387 B1
(45) Date of Patent: Aug. 14, 2001

(54) LIGHT EMITTING DEVICE MOUNTING BRACKET

(75) Inventors: Nien Chiang Liao, Lu-Chou; Jonas Lin, Lin-Ko, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/451,200

(22) Filed: Nov. 20, 1999

(30) Foreign Application Priority Data

Jul. 27, 1999 (TW) .................................................. 88212602

(51) Int. Cl.$^7$ ..................................................... G11C 11/00
(52) U.S. Cl. ......................... 361/806; 361/807; 361/809; 361/810; 361/825
(58) Field of Search .................................... 361/806, 807, 361/809, 810, 820, 825, 680, 683–686, 728, 732, 740, 747, 759, 801, 752, 796; 174/138 G, 138 H, 138 J, 139

(56) References Cited

U.S. PATENT DOCUMENTS

| | | | |
|---|---|---|---|
| 3,488,628 | * 1/1970 | Lundergan et al. ................. | 439/853 |
| 4,667,270 | * 5/1987 | Yagi ...................................... | 361/820 |
| 4,692,571 | * 9/1987 | Trinh et al. ........................... | 200/5 A |
| 4,750,091 | * 6/1988 | Van Hout .............................. | 361/740 |
| 5,138,527 | * 8/1992 | Jones ..................................... | 361/759 |

\* cited by examiner

*Primary Examiner*—Jeffrey Gaffin
*Assistant Examiner*—Phuong T. Vu
(74) *Attorney, Agent, or Firm*—Wei Te Chung

(57) ABSTRACT

A light emitting device mounting bracket includes a body and mounting hooks for fixing the bracket to a computer enclosure. The body defines a hole for mounting a light emitting device, a turret with a snap being formed at one side of the hole and a battlement being formed around an opposite side of the hole. The light emitting device is inserted into the hole by pressing on a bottom thereof, a flange of the light emitting device abutting a stopping surface of the battlement when fully inserted, and the snap of the turret engaging the bottom of the light emitting device. The mounting hooks engage with corresponding holes in a front panel of the computer enclosure, thereby mounting the light emitting device bracket to the panel of the computer system.

18 Claims, 9 Drawing Sheets

LIGHT EMITTING DEVICE MOUNTING BRACKET

BACKGROUND OF THE INVENTION

1. Field of the Invention

The present invention relates to a light emitting device mounting bracket, and particularly to a modularized bracket integrally mounting light emitting devices, a power switch and a reset switch to a computer system.

2. The Related Art

Light emitting devices are mounted to a computer system and are used to indicate the operational mode of the computer system by the light emitting therefrom. The light emitting devices are usually mounted to a front panel of a computer enclosure of the computer system.

As shown in FIG. 1, a light emitting device 10 installed in a sleeve 14 with tags 16 is mounted to a panel 12 of a computer enclosure whereby the sleeve 14 extends through a hole 18 of the panel 12 and the tags 16 engage with the hole 18. During assembly of the computer system, the tags 16 of the sleeve 14 can be easily broken as the technician pulls the wires connected to the light emitting device 10 back and forth. Therefore, if the sleeve 14 is loosened, the light emitting device 10 mounted in the sleeve 14 can disengage from the hole 18.

As shown in FIGS. 2 and 3, a light emitting device 10 installed in a base 20 with a rounded groove 22 and a beveled surface 24 is mounted to a front panel 26 of another computer chassis whereby the base 20 is pushed into a hole 28 of the panel 26 and the groove 22 engages with the hole 28. To mount the base 20 to the hole 28 of the panel 26, the base 20 is pressed to extend through the hole 28 and the groove 22 engages with the hole 28. Although the beveled surface 24 is designed for facilitating the mounting of the base 20 to the hole 28, the process of mounting the base 20 to the hole 28 is still cumbersome and time wasting.

In addition, conventional light emitting devices have to be installed in bases or sleeves separately, and then the bases or sleeves with the light emitting devices are mounted to the panel one by one. Since the prior art for mounting the light emitting device is cumbersome and time wasting, an integrated bracket for mounting light emitting devices will make assembly of computer systems faster and cheaper. Consequently, a modularized light emitting device mounting bracket is desired.

SUMMARY OF THE INVENTION

One object of the present invention is to provide a mounting bracket for mounting a set of light emitting devices to a computer.

Another object of the present invention is to provide a modularized light emitting device mounting bracket integrated with a reset button and a power button.

A light emitting device mounting bracket includes a body and mounting hooks for fixing the bracket to a computer enclosure. The body defines a hole for mounting a light emitting device, a turret with a snap being formed at one side of the hole and a battlement being formed around an opposite side of the hole. The light emitting device is inserted into the hole by pressing on a bottom thereof, a flange of the light emitting device abutting a stopping surface of the battlement when fully inserted, and the snap of the turret engaging the bottom of the light emitting device. The mounting hooks engage with corresponding holes in a front panel of the computer enclosure, thereby mounting the light emitting device bracket to the panel of the computer system.

DETAIL DESCRIPTION OF THE PREFERRED EMBODIMENTS

Figure 1:
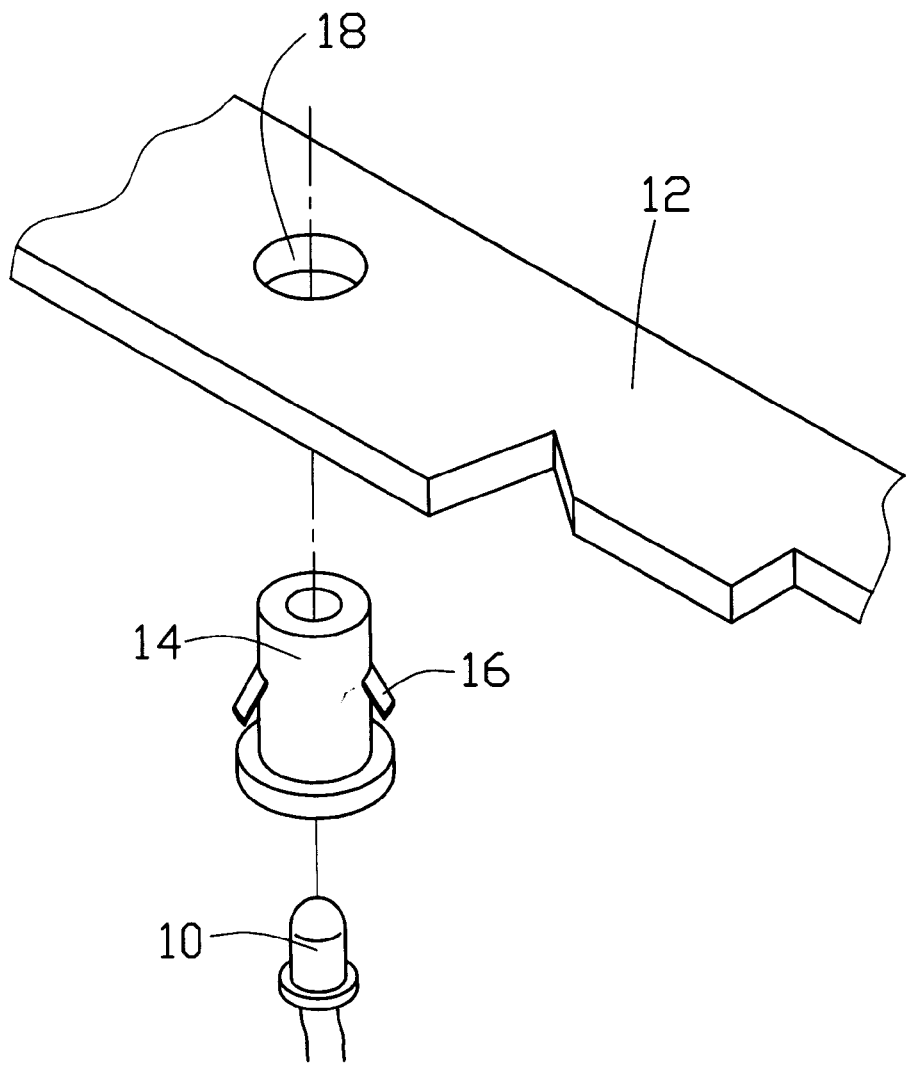
FIG. 1 is an exploded view showing a conventional light emitting device mounted to a panel of a computer system in accordance with the prior art.
Figure 2:
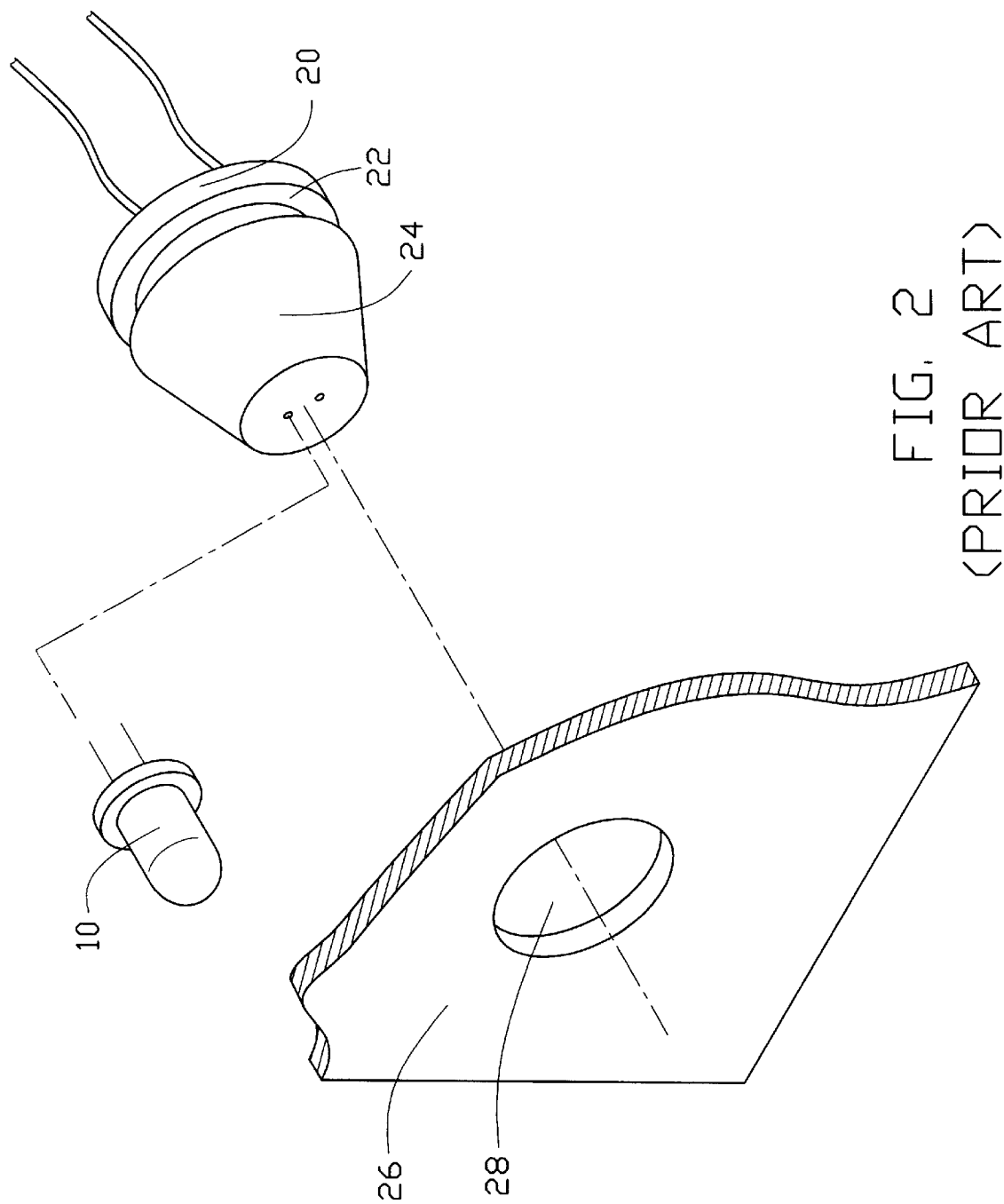
FIG. 2 is an exploded view showing another conventional light emitting device mounted to a panel of a computer system in accordance with the prior art.
Figure 3:
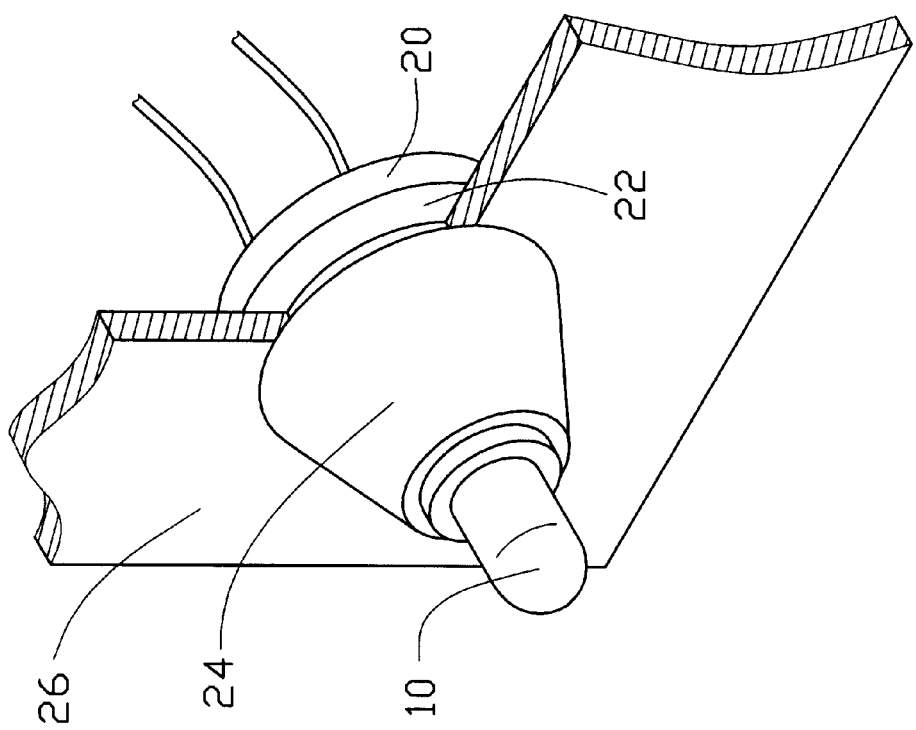
FIG. 3 is an assembled view of FIG. 2.
Figure 4:
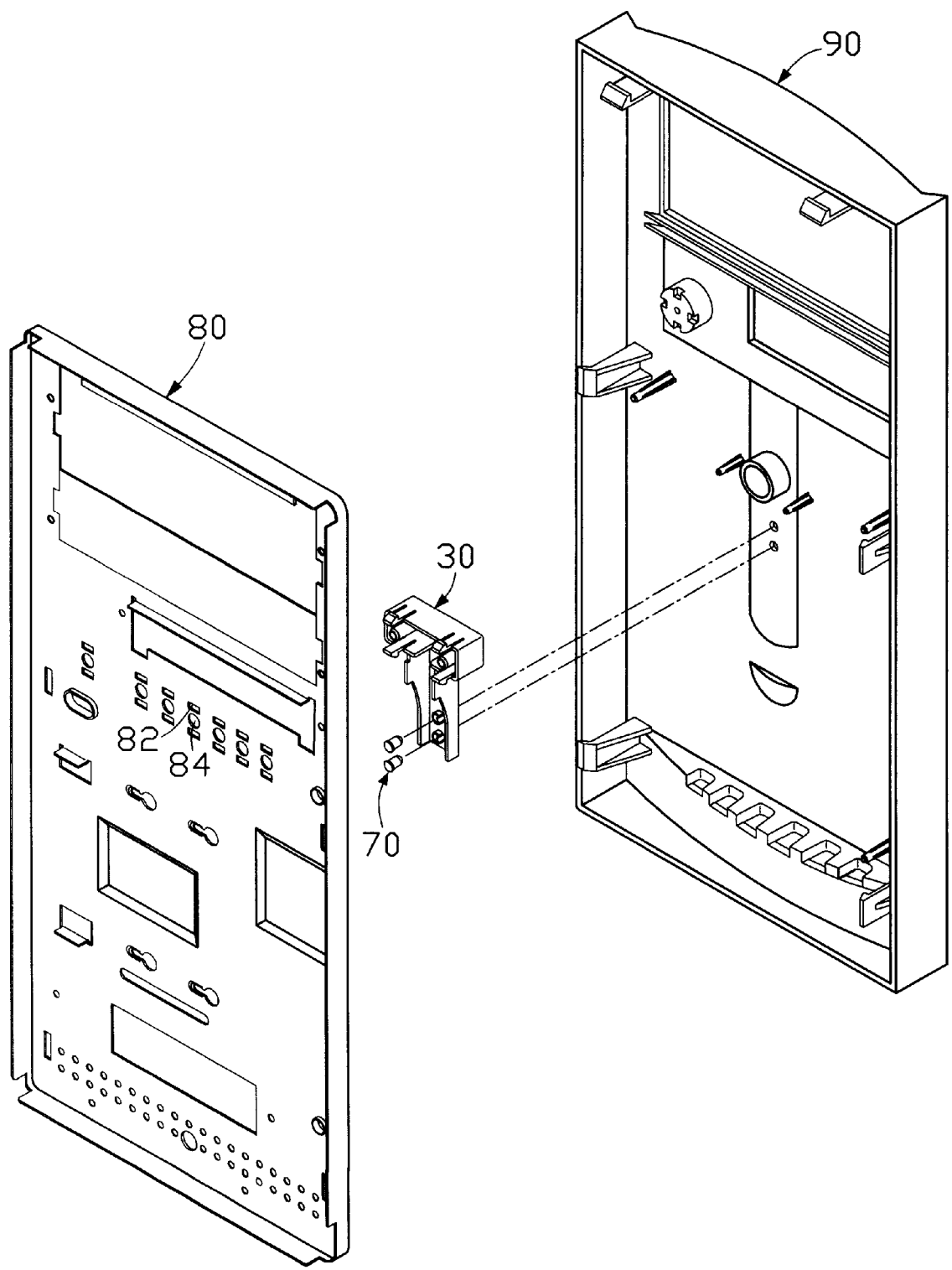
FIG. 4 is an exploded view showing a light emitting device mounting bracket, a front panel and a bezel in accordance with the present invention.
Figure 5:
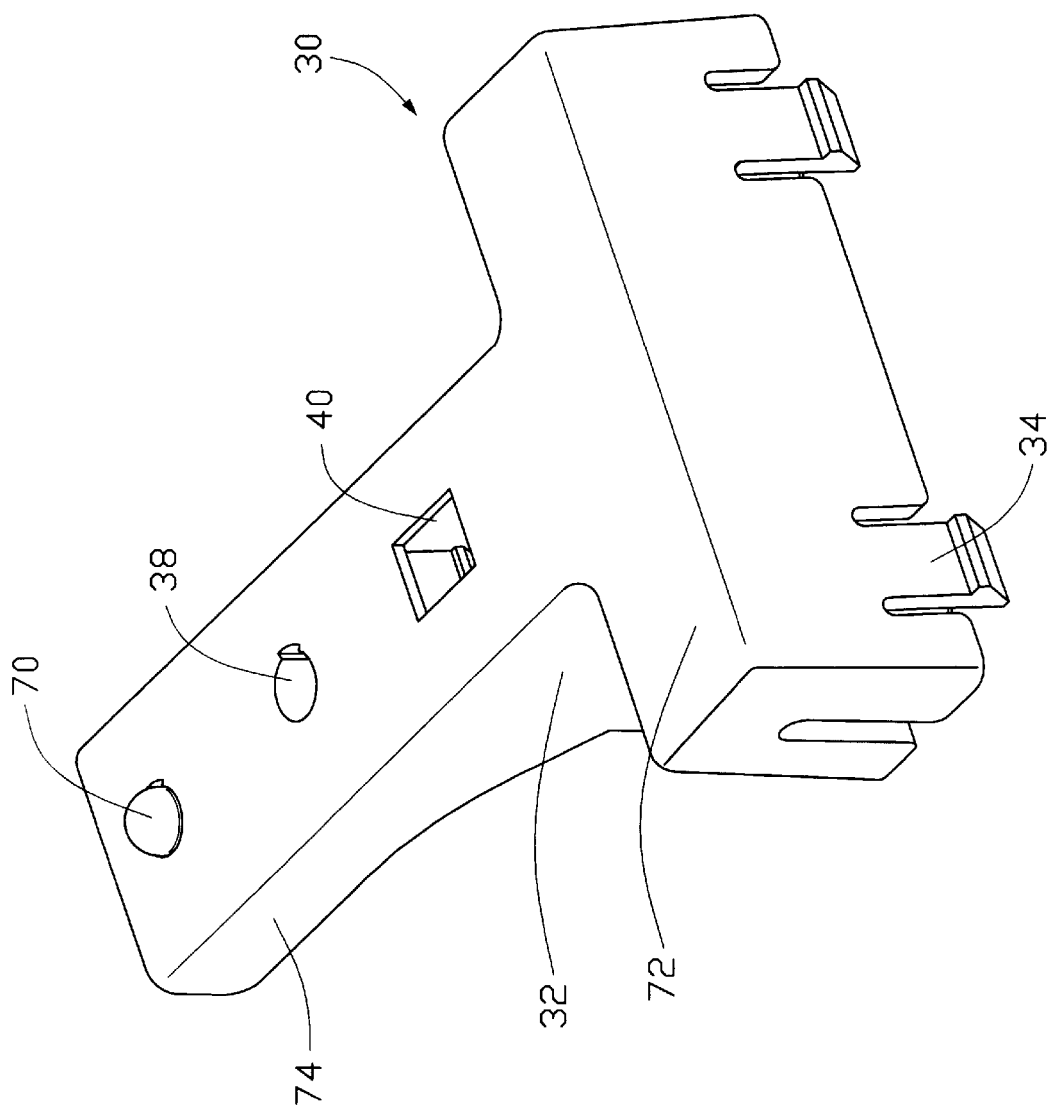
FIG. 5 is a perspective view showing the light emitting device mounting bracket in accordance with the present invention.
Figure 6:
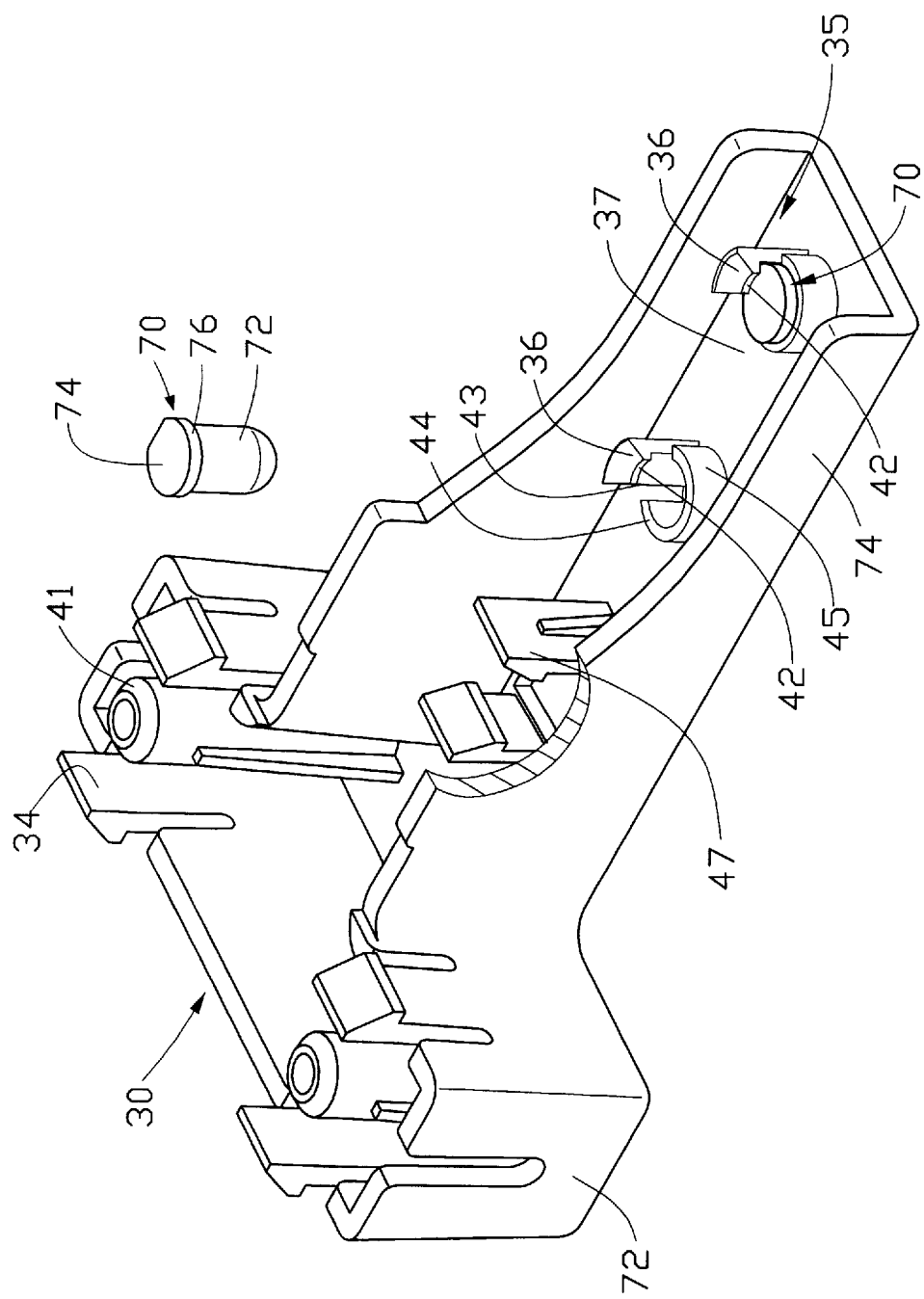
FIG. 6 is another perspective view of FIG. 5.

Referring to FIGS. 4, 5 and 6, a light emitting device mounting bracket 30 is used for mounting a light emitting device, such as a LED (Light Emitting Diode) 70, to a front panel 80 of a computer enclosure which is covered by a bezel 90. The bracket 30 includes a T-shaped body 32 made of plastic and pairs of hooks 34 depending downward from a lateral portion 72 of the body 32, and further defines a space 35 at a rear side of the body 32. Two first holes 38 in respective alignment with the apertures (not labeled) in the front bezel 90 for installing LEDs 70 and a second hole 40 for mounting a switch (not shown) are defined in a longitudinal portion 74 of the bracket 30. The first holes 38 and second hole 40 all communicate with the space 35. An inner surface 37 enclosing the space 35 forms a pair of posts 41, a pair of turrets 43, a pair of battlements 45 and a pair of towers 47. The posts 41 are each formed between a pair of hooks 34. Each post 41 into which a positioning pin (not labeled) integrally formed on the back surface of the bezel 90 extends, is inserted into a corresponding round hole 84 of the front panel 80 while each hook 34 clasps a corresponding rectangular hole 82 of the front panel 80 for positioning the bracket 30. The turrets 43 and the battlements 45 are for installing the LEDs 70 and are formed opposite each other around the first holes 38. Each turret 43 further forms a guiding surface 36 and a snap 42 and each battlement 45 forms a stopping surface 44. The two towers 47 are formed opposite to each other and are used to fix a reset switch (not shown) to the bracket 30.

The LED 70 forms a front portion 72 emitting light to indicate the operational mode of a computer system, a bottom 74 connecting to a signal source (not shown) and a flange 76 between the front portion 72 and the bottom 74. When the LED 70 is installed in the bracket 30, the bottom 74 is pressed to insert the LED 70 into the first hole 38. The front portion 72 contacts the guiding surface 36 and pushes the turret 43 outward until the front portion 72 passes the guiding surface 36, then the flange 76 abuts the stopping surface 44 and the snap 42 engages with the bottom 74. Thus a set of LEDs and a reset switch can be quickly and easily mounted in a computer enclosure.

Figure 7:
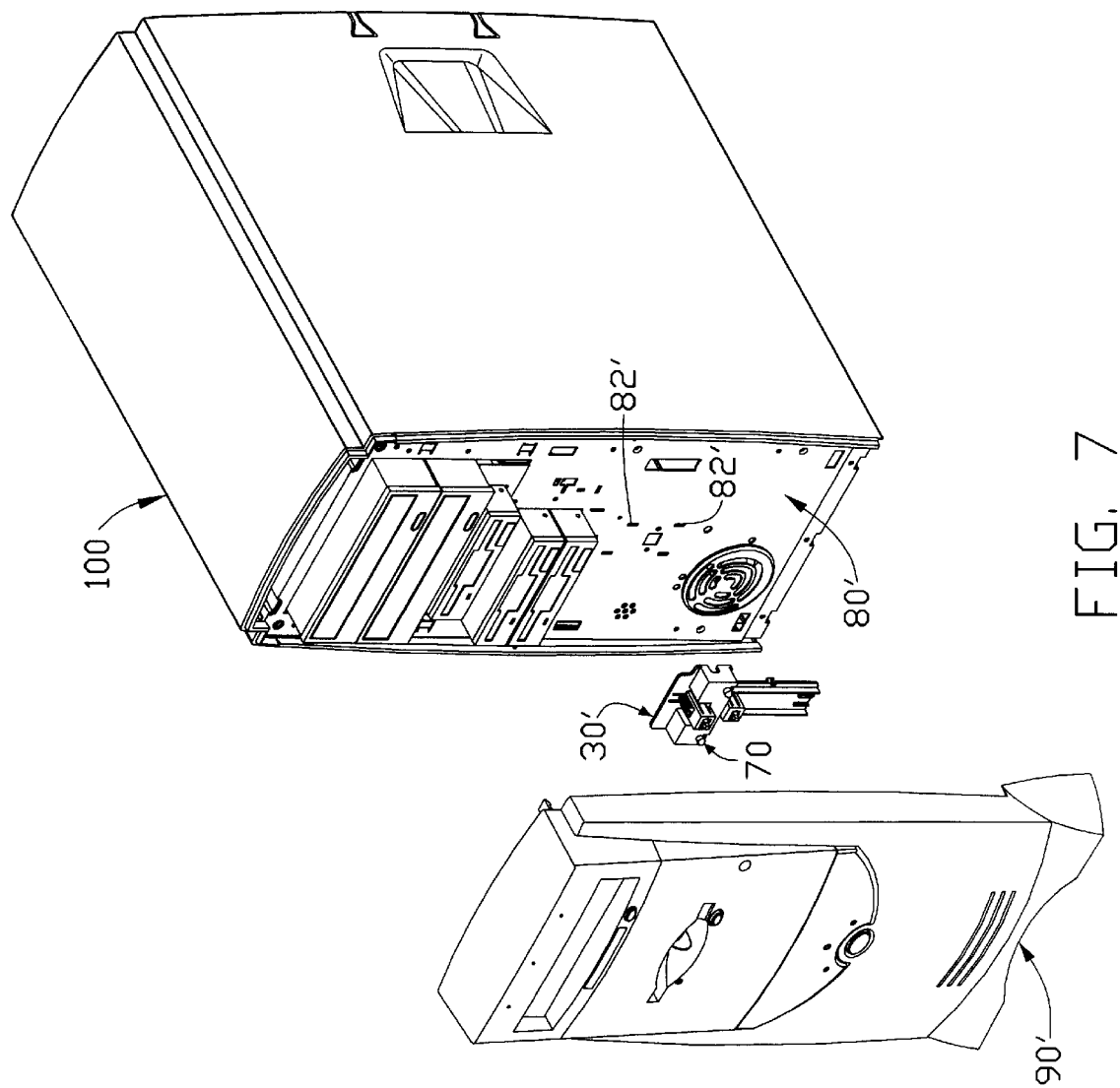
FIG. 7 is an exploded view showing a second embodiment of a light emitting device mounting bracket, an enclosure and a bezel in accordance with the present invention.
Figure 8:
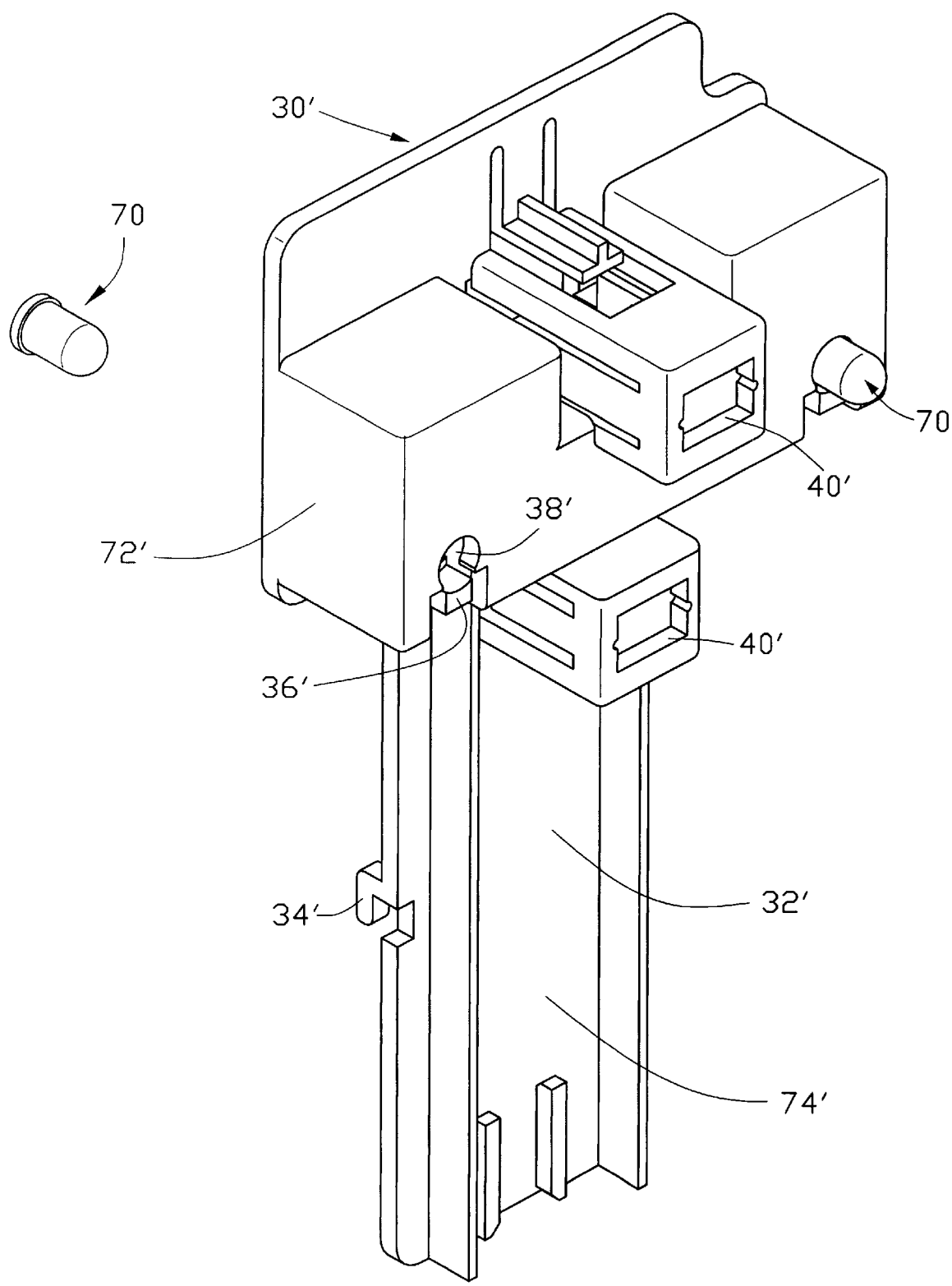
FIG. 8 is a perspective view showing the second embodiment of the light emitting device mounting bracket in accordance with the present invention.
Figure 9:
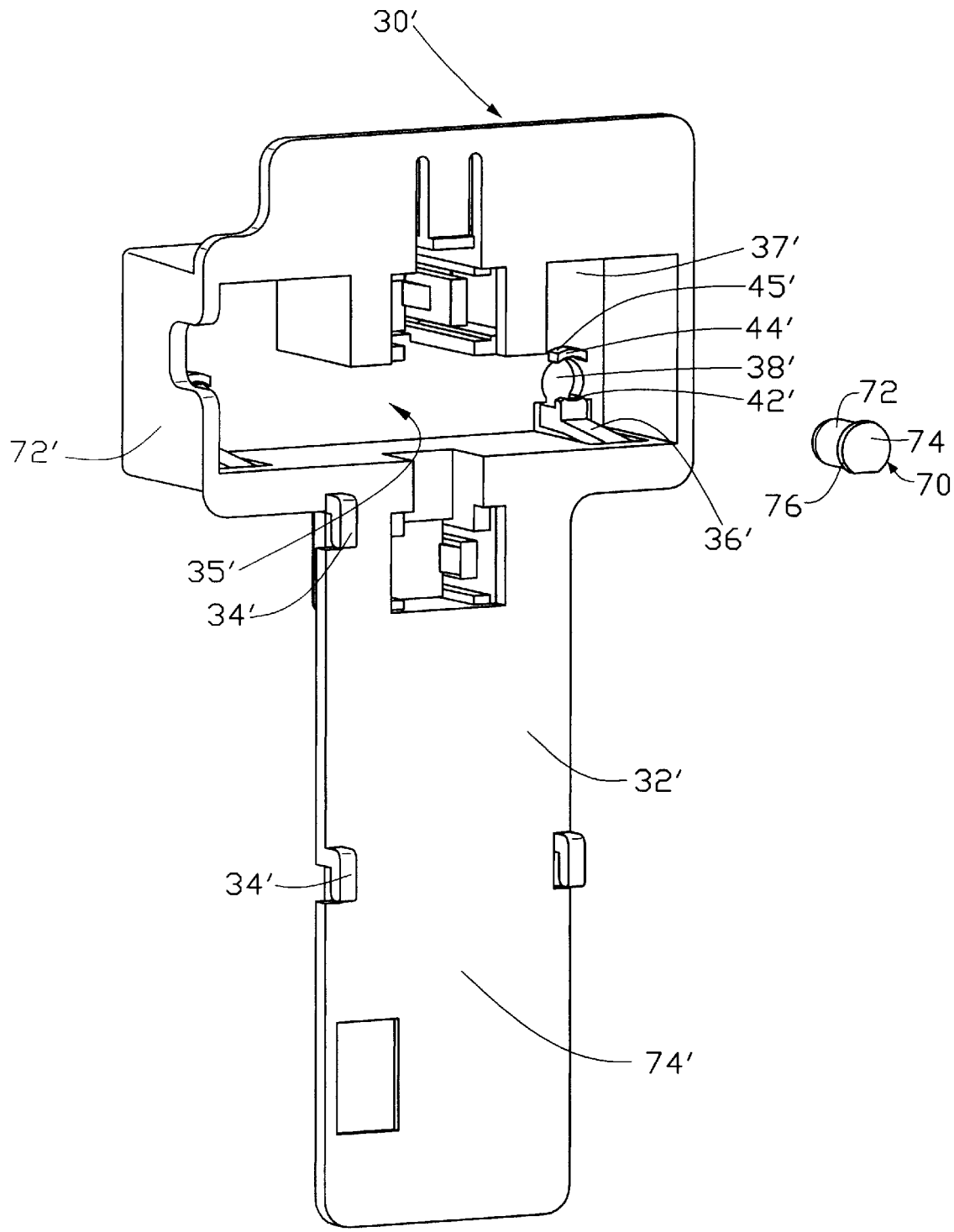
FIG. 9 is another perspective view of FIG. 8.

Referring to FIGS. 7 to 9, a second embodiment of the present invention is shown. The bracket 30' of the second embodiment is mounted to a front panel 80' of a computer enclosure 100 and a bezel 90' covers the front panel 80'. The bracket 30' includes a T-shaped body 32' having a lateral portion 72' and a longitudinal portion 74'. A plurality of hooks 34' is formed on a rear surface of the body 32', which engage with corresponding holes 82' defined on the front panel 80'. Two first holes 38' for mounting LEDs 70 therein are defined on the lateral portion 72'. Two second holes 40' for mounting power and reset switches (not shown) are defined in the body 32' along a longitudinal direction.

A space 35' is defined in the lateral portion 72' of the body 32', which communicates with an exterior of the body 32' through the holes 38' and 40'. A pair of battlements 45' each with a stopping surface 44' projects from an inner surface 37' of the body 32' around the holes 38'. A cantilevered beam 36' with a snap 42' is formed by the body 32' at an edge of each hole 38' opposite each battlement 45'.

When the LEDs 70 are installed in the bracket 30', each bottom 74 is pressed to insert each LED 70 into a corresponding first hole 38'. The front portion 72 contacts the snap 42' to push the cantilevered beam 36' outward until the front portion 72 passes through, then the flange 76 stops at the stopping surface 44' and the snap 42' engages with the bottom 74. Thus, a set of LEDs, a reset switch and a power switch can be quickly and easily mounted in a computer enclosure.

While the present invention has been described in reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. A device mounting bracket fixed to a computer enclosure and mounting at least one light emitting device with a flange and a bottom to the computer enclosure, comprising:
   a body defining a hole for positioning the light emitting device;
   a means for retainably holding said LED in the hole consisting of an arc-shaped turret with a snap formed around one side of the hole; and
   an arc-shaped battlement formed around a side of the hole opposite the turret; wherein
   when the light emitting device is inserted into the hole, the battlement abuts the flange and the snap engages with the bottom of the light emitting device to mount the light emitting device to the bracket.

2. The mounting bracket described as claim 1, wherein the turret forms a guiding surface for guiding the light emitting device slidingly into the hole.

3. The mounting bracket described as claim 1, wherein the body further defines hooks adapted to engage with openings in the computer enclosure to fix the bracket.

4. The mounting bracket described as claim 1, wherein the body further defines a post adapted to position the bracket in the computer enclosure.

5. The mounting bracket described as claim 1, wherein the body further defines a second hole for mounting a reset switch or a power switch.

6. The mounting bracket described as claim 1, wherein the battlement forms a stopping surface adapted to stop the flange of the light emitting device.

7. A mounting bracket integrally mounting a power switch, a reset switch and at least one light emitting device with a flange and a bottom to a computer system, comprising:
   a body defining at least one first hole for mounting the light emitting device and a pair of second holes for mounting the power switch and reset switch;
   a means for retainably holding said LED in each first hole consisting of an arc-shaped turret with a snap formed around one side of each first hole; and
   an arc-shaped battlement formed around a side of each first hole opposite the turret; wherein
   when each light emitting device is inserted into the corresponding first hole, the battlement abuts the flange of the light emitting device and the snap of the turret engages with the bottom of the light emitting device.

8. The mounting bracket described as claim 7, wherein the turret forms a guiding surface for guiding the light emitting device slidingly into the hole.

9. The mounting bracket described as claim 7, wherein the body further forms a plurality of hooks adapted to engage with openings in the computer enclosure to fix the bracket in the computer enclosure.

10. The mounting bracket described as claim 7, wherein the body further defines a post adapted to position the bracket in the computer enclosure.

11. The mounting bracket described as claim 7, wherein the battlement forms a stopping surface adapted to stop the flange of the light emitting device.

12. A device mounting bracket fixed to a computer enclosure and mounting at least one light emitting device with a flange and a bottom to the computer enclosure, comprising:
   a body defining a hole for positioning the light emitting device;
   a means for retainably holding said LED in the hole consisting of an arc-shaped cantilevered beam with a snap formed on the body at a side of the hole; and
   an arc-shaped battlement formed around a side of the hole opposite the cantilevered beam; wherein
   when the light emitting device is inserted into the hole, the battlement abuts the flange and the snap engages with the bottom of the light emitting device to mount the light emitting device to the bracket.

13. The mounting bracket described as claim 12, wherein the body further defines a plurality of hooks adapted to engage with openings in the computer enclosure to fix the bracket to the computer enclosure.

14. The mounting bracket described as claim 12, wherein the battlement forms a stopping surface adapted to stop the flange of the light emitting device.

15. A computer structure comprising:
   an enclosure defining a front panel covered by a front bezel;
   at least one aperture defined in the front bezel;
   a device mounting bracket positioned between the front panel and the front bezel, said bracket including:
   a body defining a hole in alignment with said aperture;
   a light emitting device (LED) positioned in the hole said means for retainably holding said LED consisting of an arc-shaped turret with a snap formed around one side of the hole and an arc-shaped battlement formed around a side of the hole opposite the turret;

means for retainably holding said LED in the hole; and means for securing the bracket to the front panel.

16. The structure as claimed in claim 15, wherein said means for securing the bracket to the front panel includes at least a hook on the bracket and at least a hole in the front panel.

17. The structure as claimed in claim 15, further including means for positioning the bracket in alignment with the front bezel.

18. The structure as claimed in claim 17, wherein said means for positioning the bracket in alignment with the front bezel includes at least a post on the bracket and a positioning pin on a back surface of the front bezel.

* * * * *